Sept. 6, 1960 J. COLKER 2,951,297
RADAR SIMULATION SYSTEMS
Filed June 1, 1955 2 Sheets-Sheet 1

INVENTOR.
James Colker.
BY W. L. Stout.
HIS ATTORNEY

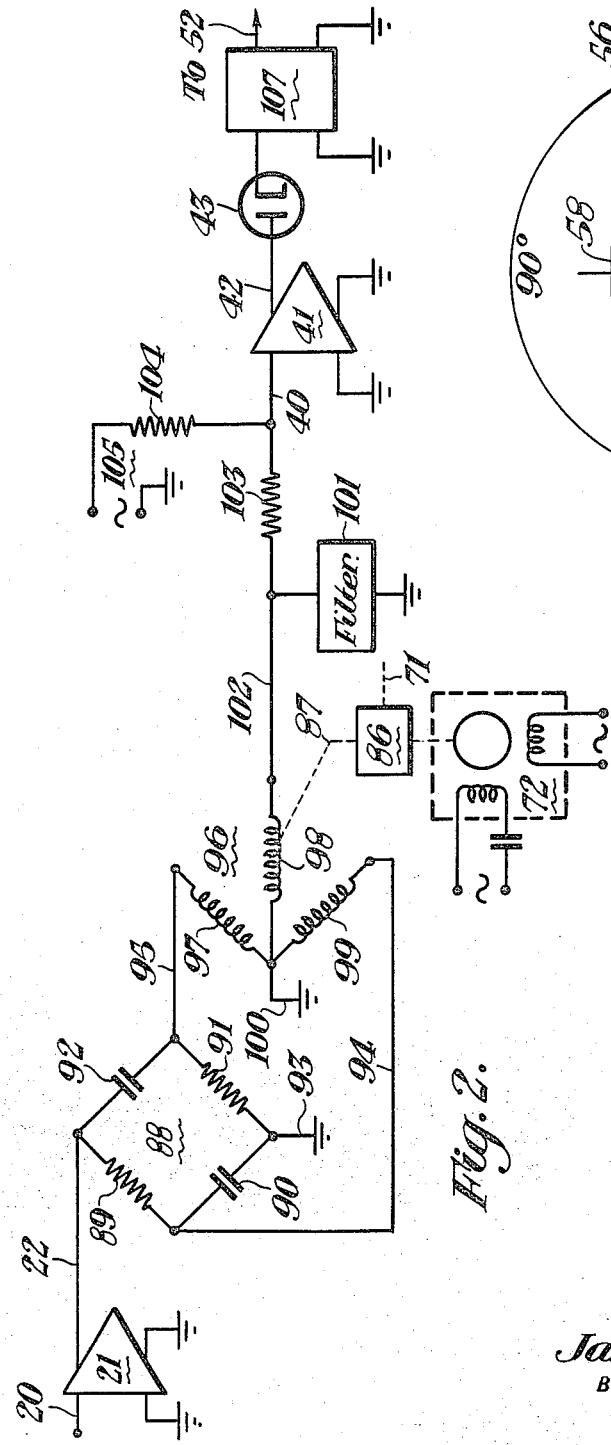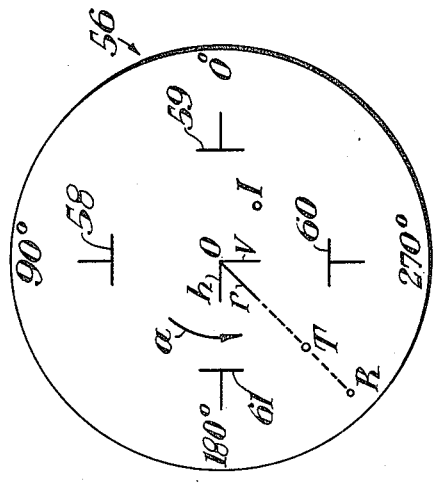
Fig. 2.
Fig. 3.
INVENTOR.
James Colker
BY W. L. Stout
HIS ATTORNEY United States Patent Office 2,951,297
Patented Sept. 6, 1960

2,951,297

RADAR SIMULATION SYSTEMS

James Colker, Penn Township, Allegheny County, Pa., assignor to Westinghouse Air Brake Company, Wilmerding, Pa., a corporation of Pennsylvania Filed June 1, 1955, Ser. No. 512,427

11 Claims. (Cl. 35—10.4)

This invention relates to radar simulation systems for observer training.

Ground control interception systems, termed GCI, are known in the art of air defense. Such systems comprise a ground-based radar station and an airborne interceptor. A controller on the ground observes the positions of the target and the interceptor by radar, and directs the interceptor toward the target by transmitting instructions to the interceptor pilot.

The ground controller and the interceptor pilot must cooperate closely, since present high aircraft speeds make the time available for completion of the interception operation extremely short. Therefore, it is necessary to train the ground observer and the pilot as a team. Since the use of a full-scale GCI system for this purpose may be impractical when the available equipment is required for actual use, and in any event would be expensive and dangerous to the pilot, it is desirable to provide means for training the interceptor team which does not involve the use of an operational GCI system. Accordingly, it is an object of my invention to provide a radar simulating training aid for use with a conventional flight simulator, so that the controller and interceptor pilot may gain experience under conditions closely simulating actual interception without requiring the removal of operational GCI systems from service or the use of an actual aircraft.

It is a further object of my invention to provide a radar simulation system in which a visual indication of the range and bearing of a target is provided when simulated antenna and target bearings coincide.

It is a further object of my invention to provide an improved signal gating circuit.

It is a further object of my invention to provide a signal gating circuit for a radar simulating system which will pass a target pulse when simulated target and antenna bearings coincide.

It is a further object of my invention to provide a servo system for transforming bearing and range information into signals adapted for cathode ray tube radial time display.

It is a further object of my invention to provide a signal gating circuit responsive to the relative phase between two alternating voltages.

Other objects and further advantages of my invention will be apparent to those skilled in the art as the description proceeds.

I shall first describe two embodiments of my invention, and shall then point out the novel features thereof in claims.

In the drawings,

Fig. 2 is a wiring diagram of a second embodiment of my invention.

Fig. 3 is a diagram of the face of the cathode ray tube employed in the systems of Figs. 1 and 2, illustrating the type of display provided.

Similar reference characters refer to similar parts in each of the several views.

Figure 1:
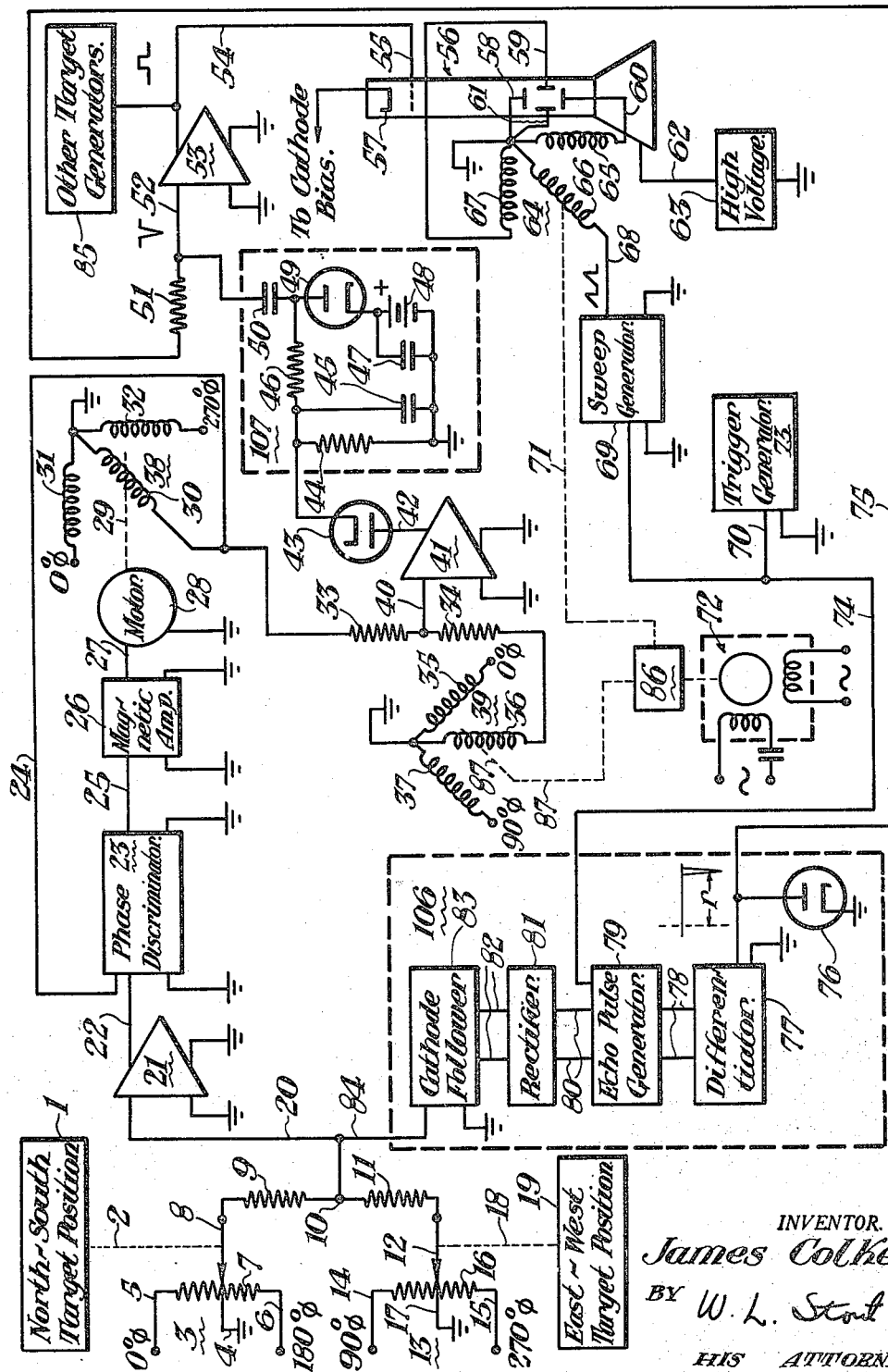
Fig. 1 is a wiring diagram of a radar simulation system according to one embodiment of my invention.

Basically, the system of the present invention provides a cathode ray tube simulating a radar scope upon which the relative positions of targets and interceptors are shown as bright spots. For this purpose, a tube 56 is employed as shown in Figs. 1 and 3. Referring to Fig. 3, the face of tube 56 is shown graduated around its periphery in terms of angular bearings from a central point O which represents the position of the ground control station. Deflection plates 58, 59, 60 and 61 are shown superimposed on the face of the tube to illustrate the mode of operation thereof. These plates are energized in a manner to be hereinafter described with the voltage between plates 58 and 60 representing the vertical component of the bearing and range vector of a target, and the voltage across plates 59 and 61 representing the horizontal component of such vector. These vector components are shown as $h$ and $v$ in Fig. 3, the resultant $r$ being the vector sum of these components. This vector rotates in the direction of the arrow $a$ at a speed proportional to the rate of scanning of the radar antenna. In operation, the electron beam from the cathode of tube 56 traces a path from point O to point R representing the maximum range of the instrument and back again, successive traverses being angularly displaced from the line OR in the direction of arrow $a$. At a point in the traverse of the beam corresponding to the range of the selected target, a grid signal is provided which intensifies the beam to provide a bright spot T which indicates the location of the target. A second bright spot I is shown indicating the position of an interceptor. As many aircraft, either interceptors or targets, as desired may be simulated simultaneously with the equipment of my invention. By noting the relative positions of the target and interceptor, the ground controller may relay interception information to a pilot-trainee in an adjacent flight simulator.

Since no actual radar equipment is employed in the present system, it is necessary to provide signal generators to simulate the signals which would be received by the radar display tube of an operational unit. For this purpose, with reference to Fig. 1, a constant speed motor 72 is provided to simulate the operation of the antenna in a manner to be hereinafter described, and a plurality of target generators such as 85 are provided to generate signals corresponding to the range and bearing of simulated targets or interceptors. The details of a typical target generator are shown in Fig. 1 and will now be described.

The position of a simulated target may be represented in rectilinear coordinates aligned respectively north and south and east and west. The north-south component of the target position with respect to the ground station is supplied by mechanical means 2 from a suitable generator 1, which may be any conventional type of servo mechanism having a shaft output proportional to a desired input signal. Since the target position generator per se does not form a part of the present invention, it is considered unnecessary to describe it in further detail. A similar target position input 19 has a mechanical output 18 to the target generator. Mechanical output 2 is connected to wiper 8 of a potentiometer 3 having a resistor 7 center-tapped at 4 and connected at terminal 5 to a source of alternating voltage having a reference phase, and at the opposite terminal 6 to a source of alternating voltage 180° out of phase with the reference. Movement of wiper 8 produces a voltage across resistor 9 having an amplitude proportional to the north-south displacement of the target from the observer's station and in phase or out of phase with the reference voltage depending upon whether the target is displaced north or south of the ground station. The east-west input 18 operates a similar wiper 12 on potentiometer 13 having resistor 16 centertapped at 17 to ground. Resistor 16 is energized at one terminal 14 by an alternating voltage 90° out of phase with the reference, and at the opposite terminal 15 with an alternating voltage 270° out of phase with the reference. The movement of wiper 12 produces a signal across resistor 11 of 90° or 270° phase depending upon whether the target is east or west of the station and having an amplitude proportional to the east-west component of the range of the target from the station. The signal at summing point 10 is accordingly the vector sum of the signals produced by motion of wipers 8 and 12, and has an amplitude proportional to the range of the target from the station and a phase proportional to the bearing of the target from the station. This signal is conducted over lead 84 to cathode follower 83, through rectifier 81 by leads 82, and over leads 80 to an echo pulse generator 79. The cathode follower and rectifier are obviously conventional and need not be further described. The echo pulse generator 79 may also be conventional, and may comprise either a phantastron circuit, described in Radio Electronic Engineering of November 1954, on pages 12 through 14 and 32, or alternatively, it may comprise a cathode coupled multi-vibrator as shown on pages 2–53, Article 15 of the Principles of Radar, published by the M.I.T. Radar School Staff, Second Edition, 1946. Here, the target position signal is combined with a timing signal from a conventional trigger generator 73, which is supplied to echo pulse generator 79 by lead 74. The trigger generator is a conventional radar system component, providing a time base for the operation of the system in a manner well known in the art. The output of the echo pulse generator appearing on leads 78 is a rectangular pulse having a length proportional to the amplitude of the input to echo pulse generator 79, and hence proportional to the range of the target from the station.

The rectangular output on lead 78 is supplied to a differentiator 77 which produces a positive and negative spike separated by a time proportional to the range of the target. A clamp diode 76 is provided to wipe off the positive spike, leaving a negative spike (as shown just above clamp 76) having a distance from the time base established by trigger generator 73 proportional to the range of the target. This range signal is transmitted over lead 75 through resistor 51 and may then be gated to lead 52 of video amplifier 53 under conditions to be hereinafter described. The output of video amplifier 53 is a positive pulse conducted over lead 54 to grid 55 of cathode ray tube 56.

Cathode ray tube 56 has a cathode 57 connected to a suitable bias as shown, an anode connection from lead 62 to a source of high voltage 63, and four deflection plates 58, 59, 60 and 61 energized from a resolver 64 in a manner to be hereinafter described.

To simulate the scanning action of the radar antenna, a constant speed motor 72 of any conventional type, here shown as a two-phase alternating current motor, is employed. A reduction gear 86 is connected to the motor shaft to drive output shafts 87 and 71 at a speed proportational to the scanning rate of the simulated antenna.

Shaft 71 drives rotor 66 of a resolver 64. Resolver 64 has stator windings 65 and 67, which are physically displaced 90°, and a wound rotor 66 which is rotatable within the stator windings to assume any desired angle with respect thereto. The rotor and stators of resolver 64 have a common ground connection, the opposite ends of the stators being connected to the plates of cathode ray tube 56 and one end of rotor 66 being connected by lead 68 to a sweep generator 69.

Sweep generator 69 produces a saw-tooth output, as shown, in synchronism with the output of trigger generator 73 over lead 70. The sweep generator is a conventional radar component and need not be further described. The length of the saw-tooth pulses produced by the sweep generator is slightly greater than a length corresponding to the maximum range of the radar system to be simulated.

Sine and cosine components of the sweep voltage are induced in windings 65 and 67 of resolver 64. The vertical sweep component across plates 58 and 60 of tube 56 is produced by winding 65, and the horizontal component across plates 59 and 61 is produced by winding 67. As stated, the rotor 66 is driven by shaft 71 at a speed proportional to the scanning rate of the simulated antenna, so that a rotating field is produced between the deflection plates of the cathode ray tube to cause the electron beam of the tube to trace the path required for a radial time display of the information supplied at the grid. Such a radial time display is known in the art and is described, for example, in the Radiation Laboratory Series, volume 22, chapter 13.

The target bearing is compared with the simulated antenna azimuth in a novel gating circuit which will now be described. The signal at terminal 10, as previously stated, has a phase proportional to the bearing of the target. This signal is conducted over lead 20 to a constant output, phase stable amplifier 21, which may be of conventional construction. The output of amplifier 21 at 22 is supplied to a conventional phase discriminator 23. Phase discriminator 23 controls magnetic amplifier 26 through lead 25. Lead 27 of magnetic amplifier 26 is connected to motor 28, which may be a conventional servomotor of any desired known type. Servomotor 28 drives rotor 30 of a resolver 38 through shaft 29 until the output on lead 24 of rotor 30 is 90° out of phase with the input on lead 22 to phase discriminator 23. Lead 24 is connected to the input of the phase discriminator in such a manner that the phase of the voltages on leads 22 and 24 are compared, and when these are 90° out of phase, the phase discriminator is balanced and produces no output at lead 25. Accordingly, a voltage of constant amplitude and 90° out of phase with the phase of the target bearing signal is produced across rotor 30 of resolver 38.

Resolver 38 comprises stator windings 31 and 32 which are physically 90° out of phase and which are energized by a voltage of reference phase applied across stator 31 and a voltage 270° out of phase with the reference applied across winding 32. The common terminals of all the windings are grounded as shown. The output of resolver 38 is applied through resistor 33 to terminal 40 of a high gain amplifier 41 for a purpose to be described.

Shaft 87 is driven by motor 72 at a speed corresponding to that of a simulated antenna as previously described. This shaft drives rotor 36 of a resolver 39 corresponding to resolver 38. The stator windings 35 and 37 of this resolver are energized by a reference phase across winding 35 and a 90° phased voltage across winding 37. The output across rotor 36 has a phase proportional to the angle assumed by shaft 87, corresponding to the instantaneous azimuth of the simulated antenna. This output voltage is supplied through summing resistor 34 to terminal 40 of amplifier 41, where it is compared with the voltage from resolver 38.

The equipment is initially set up such that the voltage supplied by resolver 38 will be 180° out of phase with the voltage supplied by resolver 39 when the simulated antenna bearing is equal to the target bearing. Accordingly, under these conditions there will be no input to amplifier 41. However, at any other time amplifier 41 will have an output proportional to the discrepancy between the target and antenna bearings. This output is applied by lead 42 to rectifying means such as diode 43. The rectified output of diode 43 is supplied to a network 107 to gate the target range signal appearing across resistor 51 in a manner to be described.

At times when there is a discrepancy between the bearing of the target and of the antenna, diode 43 conducts, charging capacitor 45. Capacitor 45 is connected across rectifying means such as diode 49 through resistor 46 and battery 48. Battery 48 is provided with a by-pass condenser 47. When the potential across condenser 45 exceeds that produced by battery 48, the plate of diode 49 will become positive with respect to the cathode and the diode will conduct. At this time, a signal appearing across resistor 51 will be shunted through condenser 50, diode 49 and condenser 47 to ground. Battery 48 is included to improve the wave form of the gated signal, but may be omitted if desired.

The equipment is designed such that the target range pulse appearing across resistor 51 is small compared to the output of amplifier 41, so that the target range pulse, which is negative, cannot drive the plate of diode 49 below the conduction value when condenser 45 is being charged by diode 43. The frequency of the target range pulse is high with respect to the ripple frequency of the output of diode 43, and condenser 50 is designed to present a high impedance to the output of diode 43 to prevent coupling of this signal into the video amplifier. The ripple frequency at the output of diode 43 contains the excitation frequency of resolvers 38 and 39 as well as a lower frequency determined by the simulated speed of antenna rotation. Condenser 45 is designed to present a high impedance to the antenna rotation frequency, but a low impedance to the resolver excitation frequency and the target range pulse frequency.

At times when the antenna and target are aligned in bearing, there is no output from amplifier 41 and condenser 45 is not charged. At this time, diode 49 is biased against conduction by battery 48 and a signal appearing across resistor 51 is presented with a high impedance to ground by condenser 50, resistance 46 and resistor 44 in parallel with condenser 45. Accordingly, under these conditions the signal is passed to lead 52 of video amplifier 53. Other target generators indicated schematically at 85 have their own gating circuits and video amplifiers, and operate similarly to supply pulses to the grid of tube 56 when the antenna is aligned with the other targets.

The operation of this embodiment of the invention will now be described. Let it be assumed initially that constant speed motor 72 is operating and that wipers 8 and 12 are aligned with center taps 4 and 17, respectively. Since with the wipers in the stated position, there is no signal at terminal 10, there will be no output of amplifier 21, phase discriminator 23, magnetic amplifier 26, or motor 28, and resolver 38 will be stationary. Accordingly, rotor 36 of resolver 39 will periodically pass through a position giving an output across resistor 34 of opposite phase to that produced across resistor 33 by resolver 38. Therefore, amplifier 41 will periodically cease to produce an output and diode 49 will stop conducting, opening the gate between resistance 51 and terminal 52 of video amplifier 53. However, since there is no signal at terminal 10, there will be no output from target range generator 106 on lead 75, and there will accordingly be no input to the video amplifier.

Next, assume that wiper 8 is moved upwardly on potentiometer 3 and that wiper 12 is moved upwardly on potentiometer 13 in response to the operation of target position generators 1 and 19 by the instructor. A signal will therefore appear at terminal 10 proportional to the vector sum of the signals between wiper 8 and center tap 4 and wiper 12 and center tap 17, respectively. This signal, having a phase which in this case will be between zero and 90° with respect to the reference, is applied through lead 20 to constant output amplifier 21. The output of this amplifier on lead 22 is a voltage of constant amplitude and of the phase of the input. Phase discriminator 23 will be unbalanced and operate motor 28 through magnetic amplifier 26 to position rotor 30 of resolver 38 until the output of the resolver on lead 24 is in quadrature with the input on lead 22. This signal will then be applied through resistor 33 to terminal 40 of amplifier 41 where it will be compared in phase with the signal from rotor 36 of resolver 39. When these signals are 180° out of phase, corresponding to the condition when the antenna and the target coincide in bearing, amplifier 41 will cease to provide an output at lead 42, diode 43 will cease to conduct, and gating network 107 will operate to permit a range pulse to be passed through the video amplifier 53. At the same time, the signal from terminal 10 is applied through lead 84, cathode follower 83, leads 82, rectifier 81, and leads 80 to echo pulse generator 79. The amplitude of the rectified input on leads 80 determines the width of a rectangular pulse generated in timed relationship to the signal on lead 74 from trigger generator 73. This signal is applied through lead 78 to differentiator 77 and the output on lead 75 comprises a positive and negative peak separated in time by an amount proportional to the range of the simulated target. The positive peak is shunted by diode 76 and the negative peak is applied through resistor 51 to lead 52 of amplifier 53, the gate being open at this time as previously described.

Since at the time in question, the antenna bearing corresponds to the target bearing, shaft 71 will have positioned rotor 66 of resolver 64 so that the sweep generator output on lead 68 will be applied to plates 58, 59, 60 and 61 so as to deflect the electron beam to the correct bearing of the simulated target. The output of amplifier 53 is applied from lead 54 to grid 55 of tube 56 at this time, and at a radial point in the sweep corresponding to the range of the target a bright spot will appear on the screen and indicate to the student the position of the simulated target.

Fig. 2 shows a second embodiment of my invention in which considerable economies in equipment can be effected if additional shaft outputs are not desired for other purposes. This embodiment corresponds to Fig. 1 except as noted, and parts corresponding in structure and function to those shown in Fig. 1 are given corresponding numbers. Since this embodiment primarily involves a modification of the azimuth gate circuit, only those components directly affected by the modification are shown.

In this embodiment of the invention, a single resolver 96 is employed to compare the simulated antenna and target bearings and to produce a signal having a phase proportional to their difference. For this purpose, the signal on input lead 20 of amplifier 21 is amplified to a constant level and maintained in phase at lead 22 as described in connection with Fig. 1. This output is shifted in phase by means of network 88 to produce a voltage on lead 95 which is 45° away from the input phase and a voltage on lead 94 which is 45° away from the input in an opposite direction, so that a resolver input having a total phase separation of 90° is available. Phase shifting network 88 comprises parallel paths including resistance 89 and condenser 90 in parallel with condenser 92 and resistance 91 between lead 22 and ground. Leads 94 and 95 are connected between the impedances in each path as shown.

Resolver 96 comprises stators 97 and 99 spaced 90° physically apart, and having a common terminal grounded at 100 as shown. Rotor 98 is also grounded at 100 and has an output lead 102 connected across a filter 101 through summing resistor 103 to input terminal 40 of high gain amplifier 41, which corresponds to amplifier 41 in Fig. 1. Rotor 98 of resolver 96 is rotated by shaft 87 from reduction gear 86 driven by constant speed motor 72 as in Fig. 1. Shaft 71 is shown in part in Fig. 2, and would go to the deflection plate resolver as in Fig. 1.

For the purpose of establishing the point of coincidence of antenna bearing and target bearing in the simulator in this embodiment, a reference source 105 is connected through summing resistor 104 to input terminal 40 of amplifier 41. Since shaft 87 makes a complete revolution for each period of simulated antenna scanning, during each revolution there will be some point at which the phase output of resolver 96 is 180° out of phase with source 105. This is the point corresponding to coincidence of the target and antenna bearing. The phase of source 105 is chosen such that the point of coincidence will be properly correlated with the position of shaft 71. At other times, the output of amplifier 41 on lead 42 is rectified in diode 43 and operates gating network 107 in the manner described in connection with Fig. 1.

The operation of this embodiment of my invention is the same as that described in connection with the operation of the Fig. 1 embodiment, except that in this case the target bearing signal is applied across the terminals of the stator of resolver 96 and combined with the antenna azimuth signal applied to the rotor of the resolver so that only one resolver is required. Filter 101 is provided because the output of limiter amplifier 21 will ordinarily contain frequency components not found in source 105. These components will be shunted in filter 101 and produce a sharper response of the gating circuit when the reference voltage and the voltage output from resolver are out of phase.

While I have described two embodiments of my invention in detail, it will be apparent to those skilled in the art upon reading this disclosure that many changes and modifications could be made in the disclosed structure within the scope of the invention. Accordingly, I do not wish to be limited to the details shown, but only by the scope of the following claims.

Having thus described my invention, what I claim is:

1. A radar simulating system, comprising, in combination, means for generating a first signal having a phase and amplitude corresponding to the bearing and range of a simulated target from a radar observation station, means for generating a second signal in phase quadrature with said first signal, means for generating a third signal having a phase in quadrature with a phase corresponding to the azimuth reciprocal of a simulated rotating radar antenna, means responsive to the amplitude of said first signal for generating a range signal, gate means responsive to phase opposition of said second and third signals, and a cathode ray tube having a control electrode, said gate means being connected between said range signal generator and said control electrode for applying said range signal to said control electrode when said second and third signals are in phase opposition.

2. In a radar simulation system, in combination, a cathode ray tube having a screen, a control electrode and beam deflection means, a resolver having a rotor, a stator for said resolver connected to said beam deflection means, a sweep voltage generator producing triangular pulses of fixed frequency connected to the rotor of said resolver, a constant speed motor having a shaft connected to the rotor of said resolver whereby said beam deflection means produces a field pulsating at said sweep frequency and rotating at a speed proportional to the speed of said motor, means for generating pulses of said sweep pulse frequency, means for adjusting the phase of said pulses with respect to said sweep pulses in accordance with the range of a simulated radar target, and gating means for applying said pulses to said control electrode at a selected angle of said motor shaft whereby a bright spot will appear on said screen at a point simulating the range and bearing of a radar target.

3. Apparatus of the class described, comprising, in combination, a constant speed motor, a first resolver driven by said motor to produce an output voltage rotating in phase at the speed of said motor, a servo motor, means for controlling the position of said servo motor in accordance with the phase of an applied voltage, a second resolver driven by said servo motor to produce an output voltage having a phase in accordance with the position of said servo motor and in quadrature with said applied voltage, means for comparing said output voltages produced by said resolvers, a first rectifier and a condenser in series with said comparing means, a second rectifier connected across said condenser, said first and second rectifiers being connected in the same direction to permit a unidirectional current flow, a source of bias voltage in series opposition with said second rectifier to prevent current flow therethrough when said comparing means output is below the level of said bias voltage, a condenser having one terminal connected between said rectifiers, means for generating a signal voltage, means for utilization of said signal voltage, and means including another terminal of said condenser for connecting said signal generating means to said utilization means, whereby said signal is shunted through said second rectifier when said output voltages produced by said resolvers are in phase opposition.

4. A signal gating circuit, comprising, in combination, first and second terminals adapted to be connected across a source of signal voltage to be gated, a first condenser connected between said first terminal and a third terminal, a parallel circuit connected between said third terminal and said second terminal, said circuit comprising a first path including a first diode and a source of bias voltage of predetermined magnitude connected to oppose flow of current through said diode, a parallel path in said circuit comprising a pair of resistors in series, a second condenser connected between the junction of said resistors and said second terminal, a second diode having one terminal connected between said resistors, and means connected between said second diode and said second terminal for generating a voltage when said signal voltage is to be shunted through said first diode and having a null when said signal voltage is to be gated.

5. A phase responsive gate system, comprising, in combination, adjustable means for generating a first alternating voltage of constant amplitude and variable phase, reference means for generating a second alternating voltage of said constant amplitude and having a phase rotating at a fixed rate, summing means connected to said adjustable means and said reference means for producing an output voltage proportional to the vector sum of said first and second voltages, a source of signal voltage of fixed polarity to be gated, output means adapted to be energized by said signal voltage, means connecting said source to said output means, circuit means shunting said output means, said circuit means comprising a pair of parallel circuit paths, first rectifier means in one of said paths connected to prevent flow of current in the direction established by said fixed polarity, said other path comprising a voltage divider having relatively high impedance, second rectifier means connected to said summing means to transmit a voltage component of a polarity opposite to said fixed polarity, a condenser connected across said second rectifying means and said summing means, and means connecting said condenser across a portion of said voltage divider, whereby said signal voltage is gated to said output means when said first and second alternating voltages are in phase opposition.

6. A radar simulation system, comprising, in combination, a cathode-ray tube having a screen adapted for plan position indication, a control grid and beam deflection means for said tube, a constant speed motor, a resolver having a rotor driven by said motor and having a stator connected to energize said beam deflection means, a sweep cycle voltage generator having an output connected to said rotor, means for generating a target position voltage having an amplitude proportional to the range and a phase proportional to the bearing of a simulated radar target, a second resolver having a stator energized by a reference source of alternating voltage and a rotor driven by said motor to produce an azimuth voltage of rotating phase, summing means for comparing the phase of said azimuth and target position voltages, means responsive to said target position voltage amplitude for generating range pulses at a point in said sweep cycle in accordance with the range of said simulated target, and gate means responsive to said summing means for applying said range pulses to said control grid when said azimuth voltage has a predetermined relationship to said target position voltage.

7. A phase responsive signal gating system, comprising, in combination, a resolver having a pair of perpendicular stator windings respectively adapted to be excited by alternating voltages in phase quadrature, a rotor for said resolver having a winding, servo motor means connected to said rotor, control means for positioning said servo motor in accordance with the phase of an applied alternating voltage, a second resolver having a rotor and a winding thereon, a stator for said second resolver comprising a pair of perpendicular windings adapted to be energized by alternating voltages in phase quadrature, a motor connected to drive said second resolver rotor, summing means connected to said rotor windings for producing a voltage proportional to the vector sum of the voltages induced across said windings, first rectifying means connected to said summing means, circuit means comprising second rectifying means and a source of voltage biasing said second rectifying means against conduction, means for applying a signal voltage to be gated to said second rectifying means, and impedance means connecting said first rectifying means to said second rectifying means whereby output of said summing means above said bias voltage level opposes said bias voltage to permit said signal voltage to be shunted through said second rectifying means.

8. A phase responsive signal gating system, comprising, in combination, signal generating means for producing a variable phase alternating voltage, phase shifting means responsive to said signal generating means for deriving a pair of alternating voltages in phase quadrature, each having a fixed phase relation to said variable phase voltage, a resolver having a stator and a rotor, said stator comprising a pair of perpendicular windings each adapted to be energized by one of said pair of derived voltages, a constant speed motor connected to drive said rotor, a winding on said rotor, a reference source of alternating voltage of predetermined phase, a balanceable network connected between said source and said winding, a source of signal voltage to be gated, an output device adapted to be energized by said signal voltage, means including a parallel impedance network connecting said source of signal voltage across said output device, said impedance network including rectifying means opposing flow of said signal voltage and biased against conduction by a bias voltage source, and means connecting said balanceable network to said impedance network whereby unbalance of said balanceable network produces a voltage opposing said bias voltage and permits said signal voltage to be shunted through said rectifying means.

9. A phase responsive signal gate, comprising, in combination, a resolver having a stator and a rotor, control means for applying an alternating voltage of variable phase to said stator, means for positioning said rotor, a reference source of alternating voltage of predetermined phase, summing means connected to said rotor and said reference source, a circuit including a source of signal voltage of predetermined polarity and an output device adapted to respond to said signal voltage, impedance means shunting said circuit, said impedance means comprising rectifying means connected in a direction to prevent current flow through said impedance means due to said signal voltage, and means connecting said summing means across said rectifying means to produce current flow therethrough whereby said signal voltage is dissipated in said impedance means unless said summing means output is below a predetermined amount.

10. In a radar simulation system, in combination, means for generating a first alternating voltage having an amplitude proportional to the range component of a simulated target from an observation station along one of a pair of rectilinear coordinates and of a first phase or an opposite phase depending on the sense of said component, means for generating a second alternating voltage having an amplitude proportional to the range component of said simulated target from said station along the second of said coordinates and in phase quadrature with said first phase and leading or lagging depending upon the sense of said component, summing means connected to said signal generating means for producing a signal having an amplitude and phase proportional to the vector sum of said first and second signals, a constant speed motor, first and second resolvers having rotors driven by said motor, said first resolver having a pair of stator windings in space quadrature, a cathode-ray tube having a control electrode and vertical and horizontal deflection plates, said vertical plates being connected across one of said stator windings and said horizontal plates being connected across the other of said windings, a trigger generator for establishing a time base, a sweep generator synchronized by said trigger generator and having an output connected across the rotor of said first resolver, said second resolver having a pair of stator windings in space quadrature excited by sources of alternating voltage in electrical quadrature, a servo motor, means for controlling said servo motor in accordance with the phase of said summing means signal, a third resolver driven by said servo motor to provide a signal having a phase in accordance with the phase of said summing means signal, gate means operated by said second and third resolver signals, range signal means connected to said summing means and said trigger generator for deriving pulses phased with respect to said trigger generator time base in accordance with the amplitude of said summing means signal, and means including said gate means for connecting said range signal means to said control electrode whereby the range and bearing of said simulated target position is indicated on said cathode-ray tube.

11. In a radar simulation system, in combination, means for generating a first alternating voltage having an amplitude proportional to the range component of a simulated target from an observation station along one of a pair of rectilinear coordinates and of a first phase or an opposite phase depending on the sense of said component, means for generating a second alternating voltage having an amplitude proportional to the range component of said simulated target from said station along a second of said coordinates and in phase quadrature with said first phase and leading or lagging depending upon the sense of said component, summing means connected to said signal generating means for producing a signal having an amplitude and phase proportional to the vector sum of said first and second signals, a constant speed motor, a first and second resolver having rotors driven by said motor, said first resolver having a pair of stator windings in space quadrature, a cathode-ray tube having a control electrode and vertical and horizontal deflection plates, said vertical plates being connected across one of said stator windings and said horizontal plates being connected across the other of said windings, a trigger generator for establishing a time base, a sweep generator synchronized by said trigger generator and having an output connected across the rotor of said first resolver, said second resolver having a pair of stator windings in space quadrature, a phase shifting network having input terminals and a pair of output terminals for deriving a pair of output voltages in quadrature from a single input voltage, means connecting said summing means to the input terminals of said network, means connecting the output terminals of said network across said stator windings of said second resolver, a reference source of voltage, gate means responsive to the phase relationship between said second resolver output and said reference voltage, range signal means connected to said summing means and said trigger generator for deriving pulses phased with respect to said trigger generator time base an amount proportional to the amplitude of said summing means signal, and means including said gate means for connecting said range signal means to said control electrode whereby the range and bearing of said simulated target position is indicated on said cathode-ray tube.

References Cited in the file of this patent

UNITED STATES PATENTS

| | | |
|---|---|---|
| 2,406,751 | Emerson | Sept. 3, 1946 |
| 2,471,315 | Dehmel | May 24, 1949 |
| 2,545,191 | Brettell et al. | Mar. 13, 1951 |
| 2,555,442 | Hales | June 5, 1951 |
| 2,604,705 | Hisserich et al. | July 29, 1952 |
| 2,658,996 | Lehde | Nov. 10, 1953 |
| 2,677,199 | Droz | May 4, 1954 |
| 2,678,382 | Horn et al. | May 11, 1954 |
| 2,730,815 | Gallo | Jan. 17, 1956 |
| 2,740,205 | Shamis et al. | Apr. 3, 1956 |
| 2,744,339 | Paine | May 8, 1956 |